(12) United States Patent
Gevorgian et al.

(10) Patent No.: US 6,985,054 B2
(45) Date of Patent: Jan. 10, 2006

(54) FERROELECTRIC DEVICES AND METHOD RELATING THERETO

(75) Inventors: Spartak Gevorgian, Gothenburg (SE); Erland Wikborg, Danderyd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/704,146

(22) Filed: Nov. 10, 2003

(65) Prior Publication Data

US 2004/0150493 A1 Aug. 5, 2004

Related U.S. Application Data

(63) Continuation of application No. PCT/SE02/00898, filed on May 8, 2002.

(30) Foreign Application Priority Data

May 9, 2001 (SE) .................................. 0101595

(51) Int. Cl.
*H01P 7/08* (2006.01)
*H01L 12/02* (2006.01)

(52) U.S. Cl. ..................... 333/235; 333/219; 333/99 S; 505/210

(58) Field of Classification Search ............... 333/235, 333/205, 219, 204, 99 S; 505/210, 700, 505/701, 866

See application file for complete search history.

(56) References Cited

U.S. PATENT DOCUMENTS

| 5,472,935 | A | | 12/1995 | Yandrofski et al. | ......... 505/210 |
| 5,495,438 | A | | 2/1996 | Omura | ....................... 365/145 |
| 5,965,494 | A | * | 10/1999 | Terashima et al. | .......... 505/210 |
| 6,216,020 | B1 | * | 4/2001 | Findikoglu | .................. 505/210 |

FOREIGN PATENT DOCUMENTS

WO    WO 96/42118    12/1996

* cited by examiner

*Primary Examiner*—Stephen E. Jones
(74) *Attorney, Agent, or Firm*—Nixon & Vanderhye, P.C.

(57) ABSTRACT

The present invention relates to an electrically controllable/tunable microwave device comprising a ferroelectric substrate with a variable dielectric permitivity and conducting electrodes, arranged on said substrate, and the capacitance of which depends on applied voltage C/V), the microwave device comprises at least two sections or parts of the substrate/electrodes for each of which different electrical field strengths are generated upon voltage application. Said generated electrical field strengths are controlled by means of the design of the device and/or the voltage application such that the slope (dC(dV) of the voltage dependence of the capacitance (C(V)) of the microwave device can be controlled.

18 Claims, 6 Drawing Sheets

FERROELECTRIC DEVICES AND METHOD RELATING THERETO

This application is a continuation PCT/SE02/00898 filed May 8, 2002.

FIELD OF THE INVENTION

The present invention relates to microwave devices, such as capacitors, or more specifically electrically tunable capacitors (varactors), and resonators. Even more specifically it relates to ferroelectric microwave devices which are electrically controllable or tunable. Particularly it relates to electrically controllable or tunable microwave devices comprising a ferroelectric substrate with a variable dielectric permittivity, or a variable dielectric constant, and conducting electrodes arranged on the substrate, wherein the capacitance of the device depends on applied voltage.

STATE OF THE ART

Different kinds of microwave components are known in the art, specifically electrically controlled components based on ferroelectric substrates. It is known to use both thin film ferroelectric substrates and bulk material ferroelectric substrates. The dielectric permittivity of a ferroelectric material is dependent on electric field, which is characteristic for ferroelectric materials. In microwave devices, varactors may e.g. be used as lumped components (with dimensions smaller than $0.1\,\lambda$, $\lambda$ being the wavelength of the microwave signal) or as distributed components (having dimensions larger larger than $0.1\,\lambda$), e.g. in phase shifters, delay lines, resonators etc. Different examples on such devices are for example illustrated in U.S. Pat. No. 5,472,935, WO 96/42118 with priority from SE-C-506 313, which documents herewith are incorporated herein by reference thereto.

More specifically the dielectric permittivity of a ferroelectric material is characterized by a non-linear dependence on the applied electric field. A simple mathematical model for such a dependence is shown in the article by O. Vendik, S. Zubko, in J. Appl. Phys., Vol. 82, pp. 4475, 1997 which document also is incorporated herein by reference. Since the dielectric permittivity exhibits a non-linear dependence on the applied electric field, a similar non-linearity in the performance of the microwave device, in which a ferroelectric substrate is used, e.g. varactors, resonators etc., will result.

One example of a ferroelectric microwave device is a ferroelectric parallel plate capacitor with e.g. a Strontium Titanate ($SrTiO_3$) substrate. For such a parallel plate capacitor the capacitance of the device $C(V)$ will vary non-linearly in dependence of the applied voltage. The dependence is given by the relationship $C=\epsilon\epsilon_0 S/d$, wherein S is the area of the capacitor plate, d is the distance between the plates, $\epsilon$ is the dielectric permittivity of the dielectric substrate (which depends on the voltage) and $\epsilon_0 = 8.85 \times 10^{-12}$ [F/m]. It is however disadvantageous in many practical applications that the capacitance varies non-linearly with the applied voltage. Particularly, for many practical applications a linear, but also some other type of non-linear relationship between the capacitance and the applied voltage, may be advantageous, or even required.

SUMMARY OF THE INVENTION

What is needed is therefore a microwave component, particularly an electrically controlled microwave component based or ferroelectrics, the voltage/capacitance characteristics of which can be controlled. Particularly a microwave component as referred to above is needed for which the dependence of the capacitance on applied voltage can be controlled. Even more particularly a microwave device, e.g. as referred to above, is needed for which the dependence of the capacitance on applied voltage can be linearised, or more generally controlled so as to assume a particular non-linear dependence.

Particularly a capacitor, a varactor, or a resonator, is needed which fulfills the above mentioned objects. Even more particularly a parallel plate (or planar) capacitor or resonator is needed through which the above mentioned objects can be achieved. Particularly a varactor is needed, which can be used as a lumped component or a varactor that can be used as a distributed component, for example in phase shifters, delay lines, resonators etc.

A method is also needed through which the voltage dependence of the capacitance of a microwave device can be controlled, wherein the microwave device particularly is based on, or uses, a ferroelectric material as a substrate. Most particularly a method is needed through which the voltage dependence of the capacitance can be a linearised or tailored to assume any desired Form of dependence.

Therefore an electrically controllable/tunable microwave device is provided, which comprises a ferroelectric (dielectric) substrate with a variable dielectric permittivity (constant) and conducting electrodes arranged on the substrate, wherein the capacitance of the device depends on applied voltage According to the invention the microwave device will comprise at least two sections or two parts upon voltage application such that different electrical field strengths will be generated in the different sections or parts, whereby the slope (dc/dv) of the line representing voltage dependence of the capacitance can be controlled. It may be positive or negative, corresponding to a convex or a concave line.

In one particular implementation the device comprises a capacitor or a varactor, or particularly a parallel plate capacitor. In another embodiment it comprises a resonator, particularly a parallel plate resonator. Development or generation of different electrical field strengths in different sections or different parts of the microwave device can be provided for in different manners.

In advantageous implementations the device actually is formed or designed so as to comprise different sections or parts, whereby each section or part has a thickness and/or an area, particularly a plate area, that differ(s) from the thicknesses and/or the plate areas of the other sections (or the other section if there is only one other section). Thus the slope of the voltage dependence (the derivative) of the capacitance can be controlled by appropriate selection of the thicknesses and/or the plate areas (shapes) of the different sections.

In a particular implementation, for a parallel plate device, the same voltage is applied to the different sections or parts of the device, the different sections/parts being in electrical contact, and the generated electrical field of a section or of a part will depend on the thickness of the respective section.

Particularly there is one common, first, electrode plate and one common ferroelectric substrate, and for each section or part another separate, second, electrode is provided. For each section the thickness of the corresponding ferroelectric portion is different, and the second electrodes are provided at different distances from the common first electrode plate. The same voltage is applied to the different sections. Then, if the second electrodes are not electrically in contact, for each section a separate connection has been to be provided to each second electrode plate for application of the same voltage. In another embodiment the second electrode plates are electrically connected to each other, but the size and/or the shapes of the sections differ. In that case only one connection is required and the same voltage will still be applied to all sections but since they have thicknesses, the generated electrical fields will be different for each section.

Thus, the device can be so designed that it comprises only one "section" before application of a voltage, the different parts or sections actually being created through the application of a voltage. Alternatively it is so designed that different sections are extinguishable or formed by discrete different sections.

In still another embodiment the different sections are completely separate but have the same size and shape. In that case different voltages will have to be applied to the respective sections in order to enable generation of different electrical fields.

In still another implementation the sections are separate but still differ from one another and the same voltage is applied to all of them. Generally the number of different sections will give the accuracy of the controllability of the slope (dc/dv) of the voltage dependence of the capacitance of the device. In a particular implementation both electrode plates are common for all parts or sections of the device, and the ferroelectric substrate varies in thickness such that one of the plates disposed thereon will vary in shape more or less continuously, such that upon application of a voltage, the generated electrical field in different parts of the device will differ. In still another embodiment the ferroelectric substrate varies in thickness such that both plates disposed on either sides thereof will vary in shape, e.g. by not being flat, such that the distance between them varies. The variation in thickness of the substrate may be continuous or consist of discrete steps.

In particular embodiments the device is disk shaped, circular, hexagonal, ellipsoidal, rectangular or of any other appropriate regular or irregular shape. More Particularly the thinnest section or part may have the smallest plate area, whereby the thinnest and smallest section is disposed at the center of the device. In one particular embodiment the thickness of the ferroelectric substrate is given a trapezoidal shape for providing different sections and, as referred to above, one electrode plate may be common, whereas the other electrode plate comprises distinct electrode plates, for defining different sections, which may be electrically connected or not. Alternatively also the other second, electrode plate is common for all sections but exhibits a continuously varying shape, following the substrate surface, such that the device will exhibit a varying thickness. Particularly the device comprises a large number of different sections or parts. In alternative implementations it merely comprises a limited number of sections or parts, e.g. three or four or any other appropriate number.

In one particular implementation the differences in thickness and plate area from one section to another, between adjacent sections, are infinitesimal, such that the cross-section of the microwave device through the ferroelectric substrate and the common and/or sectional electrodes will exhibit a substantially continuously changing thickness with the thinnest section at the center. Particular one surface, here called the upper surface, of the substrate is non-planar, and symmetrical, with respect to the center of said upper surface, two-dimensionally or radially, increases its distance from the second, electrode plate(s) towards the circumference of the device.

In an alternative implementation it comprises a planar device with a thin film ferroelectric substrate structure with planar electrodes disposed on the substrate such that a gap is formed between the electrodes. In that case the gap is so shaped that the dependence of the capacitance on the applied voltage can be controlled. A gap may be shaped so as to vary in discrete steps, thus providing the different sections. In an alternative implementation the gap is shaped so as to vary substantially continuously. According to different implementations a common second electrode, a ground plane, is provided, whereas in other implementations it is not.

The device may also, as referred to above, comprise a number of electrically separate sections which have different thicknesses (and plate areas), and the same voltage may be applied to the different electrode sections. In one embodiment the electrically separate sections have substantially the same shape, size and thickness and different voltages are applied to the different sections. Any combination is in principle possible, e.g. that different sections may be used and different voltages may also be applied to the different sections such that a combination of shaping or designing the device and of application of different voltages is implemented. Alternatively it is merely the design that is made such that the voltage dependence of the capacitance can be controlled by providing for different sections in which different electric field strengths are generated.

The substrate particularly comprises a substrate of $SrTiO_3$, of a bulk material or comprising a thin film. Other alternatives are for example $BaSrTiO_3$, Barium Strontium Titanate etc. The conducting electrodes may comprise normal conductors, e.g. of Au, Al, Cu. Alternatively they comprise superconductors, e.g. made of YBCO, Nb etc., The electrodes may also comprise low or high temperature superconductors. In one particular implementation a normal conducting layer is applied above a superconductor or a high temperature superconductor. In still another embodiment a buffer layer, which is thin, may be arranged between superconducting electrodes and the ferroelectric substrate.

The invention also discloses a method of controlling the voltage/capacitance characteristic of an electrically controllable/tunable microwave device comprising a ferroelectric substrate, with a variable dielectric permittivity, and conducting electrodes disposed on said substrate. The method comprises the steps of; disposing the ferroelectric substrate and the electrodes and providing for voltage application such that a different electric field strength is generated for each of a number of sections or parts thus formed in the device; controlling the generation of different electric field strengths, or a more or less continuously varying electric field strength, for controlling the slope of the voltage dependence of the capacitance.

Particularly the method comprises the steps of; designing the substrate and the electrodes such that different sections are formed; applying the same voltage to the different sections such that different electrical field strengths are generated for each of said sections depending on the size and/or thickness of the sections. Even more particularly the method comprises the steps of, for a parallell plate device; shaping the substrate and the electrode(s) such that a first central section will have a first (plate) area and a first thickness; increasing for subsequent sections, the thickness and the area stepwise or continuously. In particular, on one side of the substrate, a common electrode plate may be provided, the device constituting a parallel plate resonator or capacitor. Alternatively the substrate is provided between two common electrode plates of which one or both is given a shape corresponding to the surface(s) of the substrate such that different sections are formed upon application of a voltage. In an alternative embodiment, it comprises the steps of; providing a number of electrically separate sections of the same size and shape; applying different voltages to the similarly sized and shaped sections, such that for each section a different electrical field is generated. Alternatively one common substrate with a varying thickness is used and one of the first and second electrodes comprises separate portions, the same voltage being applied to each one of the sections.

In an alternative embodiment, for a planar device, the method comprises the steps of; designing the width of the gap between planar electrodes disposed on a ferroelectric substrate such that upon application of a voltage to the electrodes, the generated electrical field strength will vary such as to allow for controlling the slope (dc/dv) of the dependence of the capacitance on the applied voltage.

The method may in general comprises the step of designing the substrate and/or the electrodes such that, upon voltage application, the capacitance varies with the applied voltage in a desired manner. Advantageously the method comprises the step of making the dependence of the total capacitance on the applied voltage linear, i.e. the C(V) dependence is linearised. This means that dc/dv is constant.

BRIEF DESCRIPTION OF THE DRAWINGS

The invention will in the following be further described, in a non-limiting manner, and with reference to the accompanying drawings, in which.

DETAILED DESCRIPTION OF THE INVENTION

Figure 1:
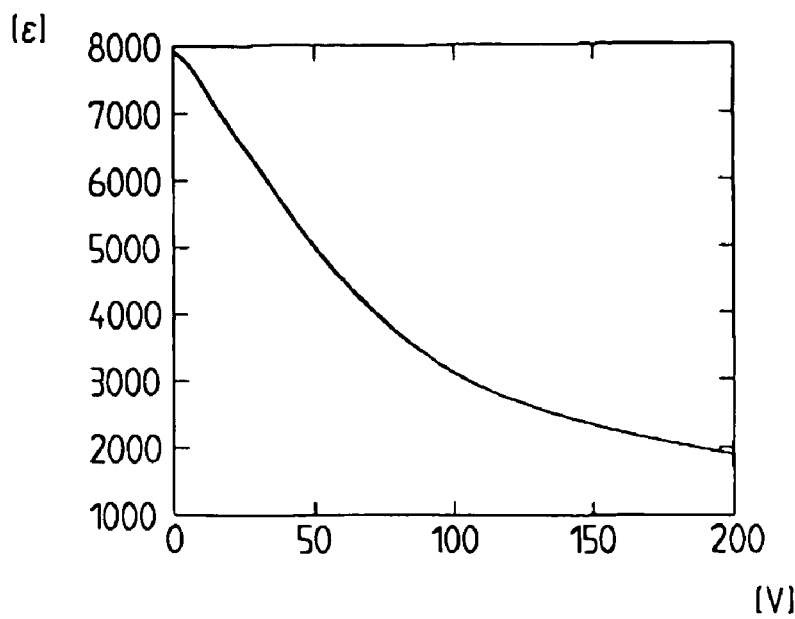
FIG. 1 is a diagram illustrating the dependence of the dielectric permittivity of a substrate of $SrTiO_3$, at 35° K, on applied voltage.

The dielectric permittivity, or the dielectric constant, of a ferroelectric material depends non-linearly on the applied voltage, or rather on the resulting applied electric field. In FIG. 1 the dependence of the dielectric constant of $SrTiO_3$, which is a typical ferroelectric material, at a temperature of 35K, on applied voltage, is illustrated. More specifically FIG. 1 illustrates the dependence of the absolute value of the dielectric constant on applied voltage in the voltage range 0–200V. Therefore a parallel plate capacitor made of such a ferroelectric material will exhibit a similar non-linear dependence of the capacitance of the device on the applied voltage, as given by the relationship $C=\epsilon\epsilon_0 S/d$, where S is the plate area of the capacitor, d is the distance between the plates and $\epsilon$ is the dielectric constant (dependent on V), and $\epsilon_0=8.85\times10^{-12}$ [F/M].

In practical applications a linear or another type of non-linear dependence, i.e. different from the one shown in FIG. 1, between the capacitance and the applied field or voltage, is often required. Therefore, according to the invention, a way of controlling the slope of the C(V) dependence, (i.e. the derivate dC/dV) is suggested. Particularly it may be linearised (corresponding to dC/dv being a constant) and/or tailored as illustrated in the embodiments to follow below.

According to one embodiment of present invention a microwave device is suggested in which for each of at least two sections or parts of the device, upon a voltage application, the generated electrical field will be different For one and the same applied voltage the generated electrical field in the respective section/part will be different, since the generated electrical field depends on the thickness of the device, or the distance between the plates as E=V/d, on condition that the shape and/or size of the device is not the same throughout the device. This means that a different electric field can be generated at different sections by giving the sections different shapes and/or sizes. It is also possible to apply different voltages to different sections, or to implement a combination of both, i.e. providing a device of varying size and/or shape and to apply different voltages to different parts of the device. This is also schematically illustrated in FIGS. 9A, 9B.

As one example, a disk shaped capacitor, or a parallell plate resonator, may be formed or designed to comprise two or more sections of thicknesses d1, d2, d3, . . . with plate areas S1, S2, S3, . . . . The dependence of the total capacitance of the applied voltage of such a structure can be controlled or tailored, specifically linearised, by properly selecting the thicknesses d1, d2, d3 and the areas S1, S2, S3, . . . of the different sections. The total capacitance of such a device will particularly be given by:

$$c(E)=\epsilon(E)\epsilon_0 S1/d1+\epsilon(E)\epsilon_0 S2/d2+\epsilon(E)\epsilon_0 S3/d3+\ldots = S1(\epsilon(E)\epsilon_0/d1+\epsilon(E)\epsilon_0(S2/S1)/d2+\epsilon(E)\epsilon_0(S3/S1)/d3+\ldots)= S1(\epsilon(E)\epsilon_0 m1/d1+\epsilon(E)\epsilon_0 m2/d2+\epsilon(E)\epsilon_0 m3/d3+\ldots),$$

wherein m1(=1), m2, m3 are the ratios of the plate areas, S1/S1; S2/S1; S3/S1.

Thus the slope of the C(V) dependence can be controlled by proper selection of thicknesses and plate areas.

Figure 2:
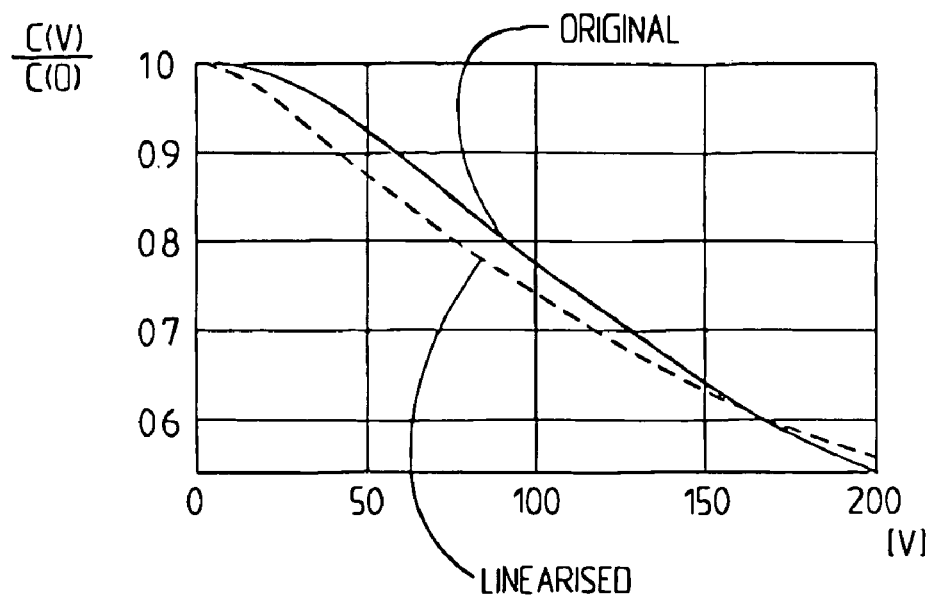
FIG. 2 is a diagram schematically illustrating a comparison between the C(V) dependence for a varactor comprising one section and for a linearised varactor comprising three sections according to the present invention.

FIG. 2 is a diagram schematically illustrating a comparison between the C(V) dependence by means of the relative capacitance at a given applied voltage in relation to the capacitance at zero bias, i.e. no applied voltage, for a one-section varactor wherein d1=d2=d3 (indicated by a continuous line), and a linearised C(V) dependence for a corresponding three section varactor based on $SrTiO_3$ with d1=2 $\mu$m, d2=8 $\mu$m, d3=20 $\mu$m, the ratios of the plate areas, see the formula above, here being m1=0.5, m2=7 and m3=16, (indicated by the dashed line in the figure) i.e. in this case the relative capacitance, with C0(V,d,30)/C0(0,d,30) (unbiased) C1(v,d,30)/C1(V,d,0) (linearised)

Similar results can be obtained irrespectively of whether the device is circular or non-circular, e.g. rectangular, ellipsoidal etc. The ferroelectric substrate, particularly the thickness thereof, may be designed with different shapes, trapezoidal or other shapes, in order to provide for a required slope of the voltage dependence of the capacitance of the device. The principle is applicable to bulk ferroelectric substrates as well as to thin film ferroelectric structures. It is also possible to, alternatively or additionally, apply different voltages to different sections etc. Furthermore the concept is applicable to parallel plate devices as well as to planar devices. In the following some exemplary implementations will be illustrated.

Figure 3A:
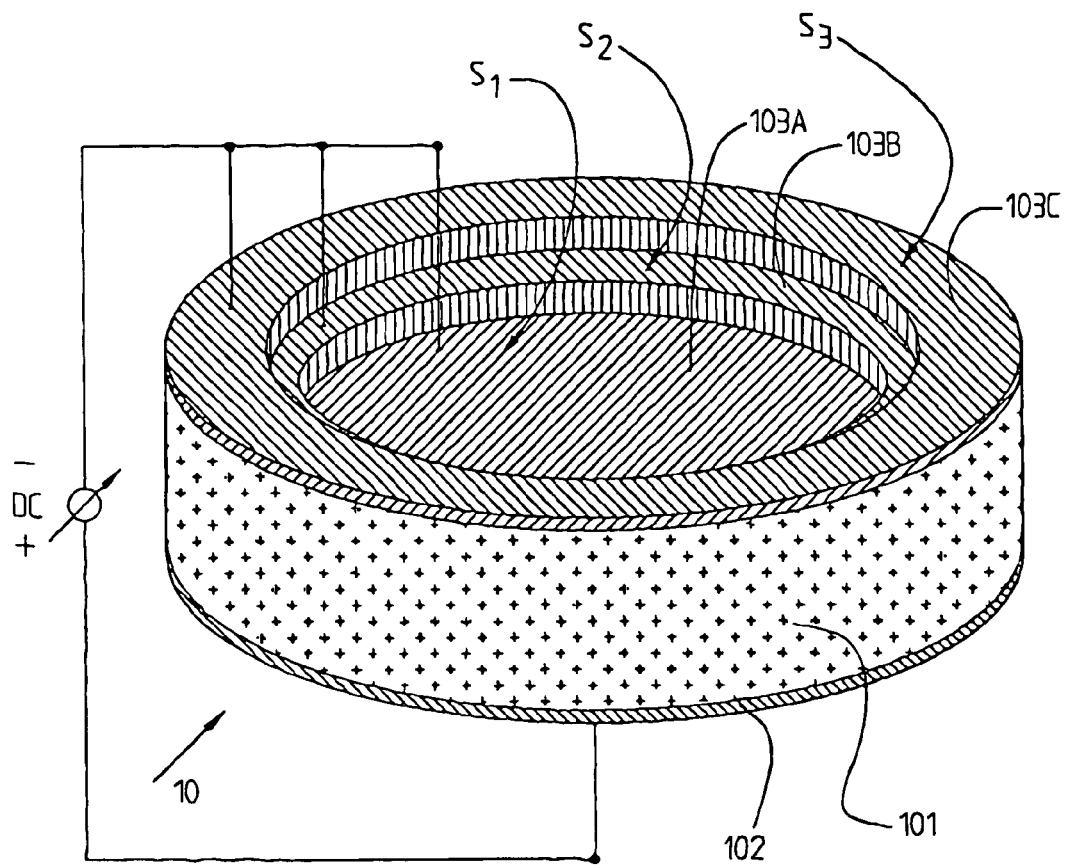
FIG. 3A illustrates a circular parallel plate capacitor/resonator according to a first embodiment of the present invention.

FIG. 3A illustrates a disk shaped capacitor (or parallel plate resonator) 10 comprising three different sections. Actually it is capacitor if the dimensions are much smaller than the microwave wavelength in the dielectricum, whereas for a resonator the dimensions should be comparable to or larger than the wavelength of the microwave in the dielectricum. The disk shaped capacitor or parallel plate resonator 10 here comprises a ferroelectric (dielectric) substrate 101 e.g. of $SrTiO_3$, with a bottom electrode 102 which is common for all the three sections and three separate upper electrodes, 103A, 103B, 103C disposed on different parts or sections of the substrate 101. The ferroelectric substrate 101 is so designed that a first section is given by the central part of it having a given radius and thickness, whereas the second section is thicker and in the form of a ring, and finally the third section is the thickest, also shaped as a circular ring. The three upper electrodes 103A, 103B, 103C are in this embodiment not electrically interconnected. Thus the voltage has to be applied separately via a lead or a conducting wire to each one of the upper electrodes. In this embodiment the same voltage is applied to each section, and when the biasing voltage is applied, the dielectric constant of the non-linear ferroelectric substrate 101 is changed and it will be different for each section and different electric fields are developed. For a resonator, the resonant frequency (and the Q-factor) is changed. Particularly the ferroelectric substrate 101 comprises bulk single crystal $SrTiO_3$. The upper electrodes have plate areas S1, S2, S3 as discussed with reference to FIG. 2. The total capacitance of such a structure is given by the formula indicated above in association with FIG. 2.

Figure 3B:
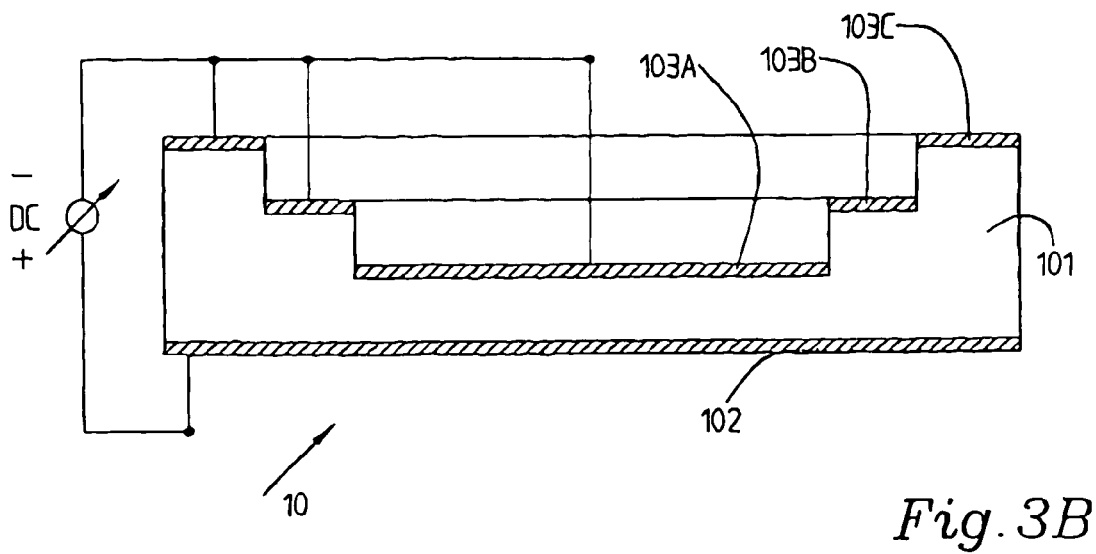
FIG. 3B is a cross-section of the device of FIG. 3A.

FIG. 3B is a cross-sectional view of the circular parallell plate resonator/capacitor of FIG. 3A.

In one embodiment the conducting electrodes 102, 103A, 103B, 103C comprise a normally conducting material or a normal metal film, e.g. of Au, Al, Cu. In other embodiments superconducting electrodes are used, particularly high temperature superconducting films, e.g. of YBCO. Also other superconducting materials may of course be used. In one embodiment (not shown) a normally conducting layer may be arranged above a superconducting layer both to provide for functioning also at temperatures above Tc, which is the temperature at which the superconducting material becomes superconducting, i.e. such that operation is enabled both in a superconducting and in a non-superconducting state, and for protective purposes as a protection layer. Furthermore it is possible to arrange a thin buffer layer between the conducting electrodes (particularly if they are superconducting) and the ferroelectric substrate, among others in order to improve the quality of the superconducting films at the deposition stage and to stabilize the superconducting film-ferroelectric system by controlling the chemical reactions, e.g. exchange of oxygen between the superconducting films and the dielectric substrate. Although in this embodiment the same voltage is applied to each one of the sections, it will also be possible to apply different voltages to the different sections and thus to combine designing of the ferroelectric substrate and the application of different voltages to obtain the appropriate generated electric fields in the respective sections to obtain the desired slope of the voltage dependence of the capacitance.

Figure 4:
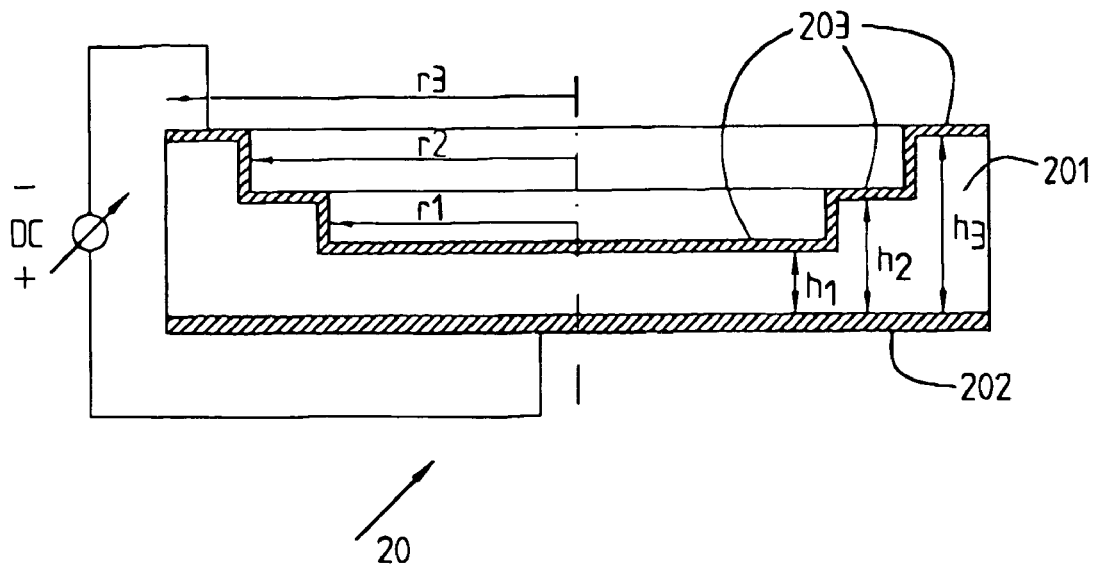
FIG. 4 is an isometrical view of a circular parallel-plate device comprising three sections according to another embodiment of the invention, FIG. 5 schematically illustrates another embodiment of a device in which one of the substrate surfaces, on which e.g. a common electrode plate is disposed, is non-planar and varies continuously such that the thickness of the substrate will vary.

In FIG. 4 a microwave device comprising a parallel plate resonator or a capacitor 20 is illustrated. It comprises three sections, similar to the embodiment of FIG. 3A, 3B. On one side of the ferroelectric substrate 201 a bottom electrode, or more generally a first electrode 202 is disposed, which is common for all the three sections, whereas on the too of the ferroelectric substrate 201, or rather on the opposite side of the ferroelectric substrate, a second electrode 203 is disposed which is given the same shape as the upper (here) portion of the ferroelectric substrate. A first (central) and circular section has a first thickness $h_1$, the second section, which is ring shaped, has a second thickness $h_2$, and the third section, which also is ring shaped, has a third thickness $h_3$, wherein $h_3 > h_2 > h_3$. The thickness of the ferroelectric substrate 201 varies with discrete steps, the thinnest section being provided at the center of the device The first section has a radius $r_1$, the second section defines a ring with an outer radius $r_2$ and the third section has an outer radius $r_3$, wherein $r_3 > r_2 > r_1$. Since the different portions of the upper electrode 203 in this embodiment are electrically connected, i.e. the upper electrode 203 actually comprises one common electrode, a voltage is applied to the upper electrode, i.e. to the three sections, by means of one single lead. In this embodiment it is connected to the third section. However, in an alternative embodiment it may be connected to the first section or to the second section. Thus, in this embodiment the same voltage is applied to all the sections, and the variation in the generated electrical field is given exclusively by the design of the different sections.

Figure 5:
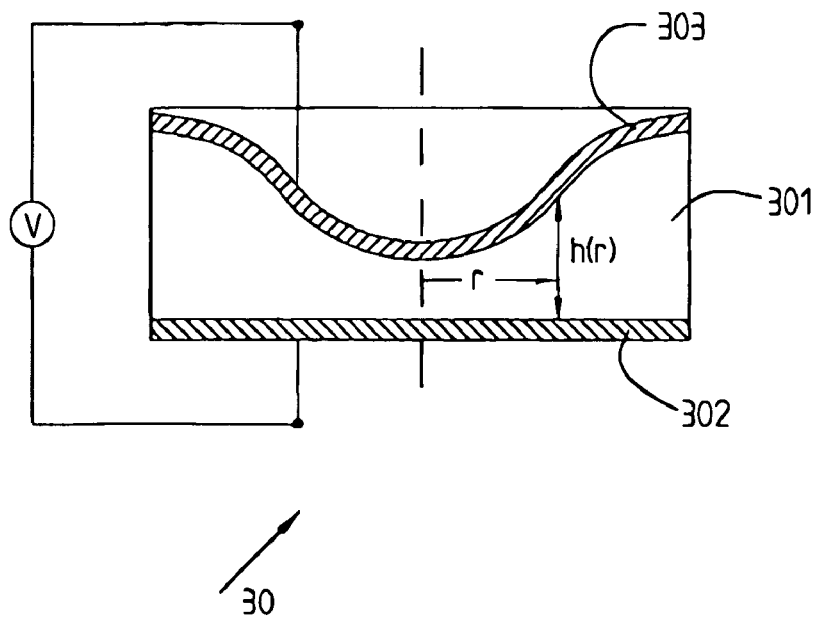

FIG. 5 discloses still another example of a parallel plate microwave device 30. A ferroelectric substrate 301 is provided with a first electrode 302 and a second electrode 303 on opposite sides thereof. It should be clear that upper and lower are here merely are denotations given for explanatory reasons. The circular ferroelectric substrate is flat on one side. The other (upper) side or surface is so shaped such that the substrate thickness will be smallest at the center. For a circular device the substrate has a radius r, and thus the thickness will be a function of the distance from the center, h(r). Thus in this embodiment there are no distinct sections, but at the application of a voltage to the electrodes 302, 303, the generated electrical field will be different in different parts of the device, even if the same voltage is applied to each section or to each part. Due to the variation in thickness of the ferroelectric substrate, the generated electrical field will vary throughout the device, and it can be controlled such that the required or wanted slope of the dependence of the capacitance of the device can be obtained by appropriately selecting the design of the ferroelectric substrate.

Figure 6:
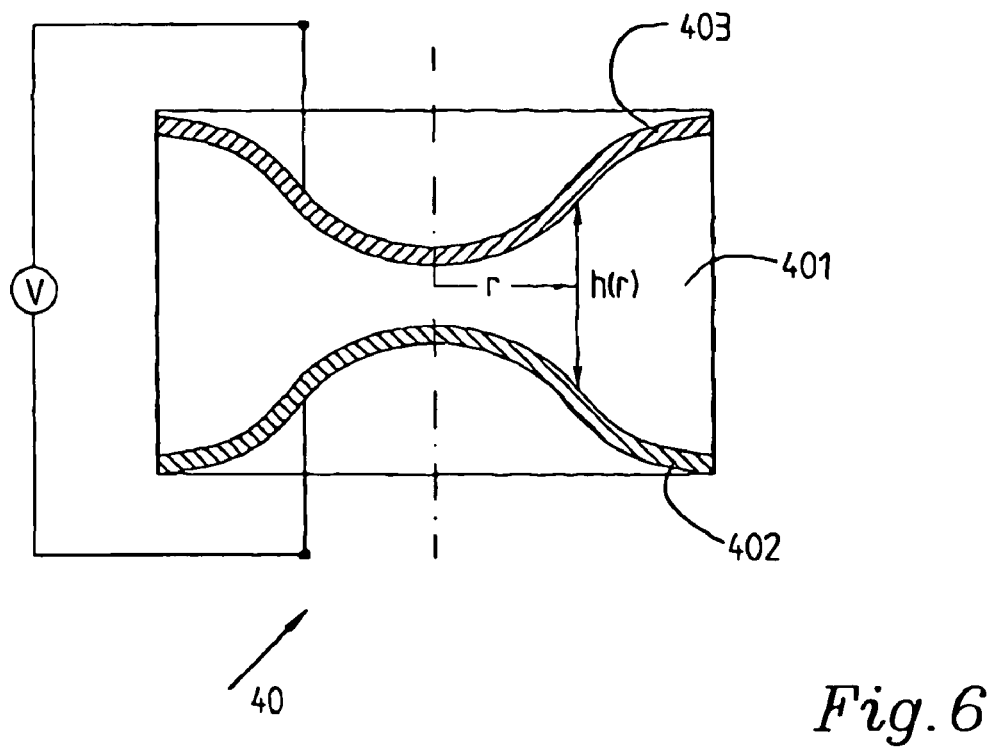
FIG. 6 illustrates another embodiment of a device according to the invention wherein the substrate has a continuously varying thickness by means of non-planar upper and lower surfaces.

FIG. 6 shows still another example of a parallel plate microwave device 40 with a ferroelectric substrate 401 with a varying thickness. It is also here supposed that the device has a circular shape and the thickness of the ferroelectric substrate h depends on the radius, h(r), i.e. it varies with the distance from the center. Both the upper and the lower surface of the ferroelectric substrate vary continuously in a similar way, e.g. assuming the shape of each a bowl, which bowls face outwards in opposite directions, such that the thickness of the device increases towards the periphery of the device, the angle of inclination of the bowls being such that the required slope of the C(V) dependence is obtained.

Figure 7:
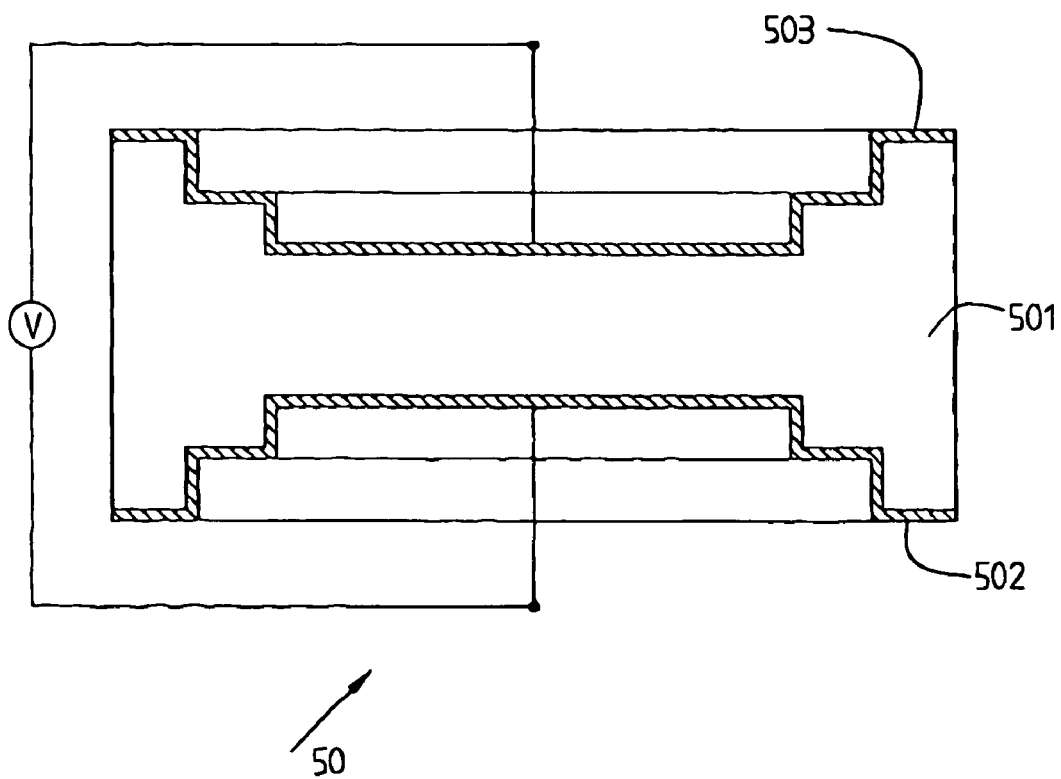
FIG. 7 illustrates very schematically an embodiment with a substrate for which the thickness varies in discrete steps, provided for by an upper surface and a lower surface being non-planar.

FIG. 7 illustrates still another implementation of a ferroelectric substrate 501 with a varying thickness. The thickness varies stepwise in a symmetrical manner on both sides and common electrodes 502, 503 are provided on either side of the substrate. The thickness varies in discrete steps such that three different sections are provided with each a given diameter and a given thickness. The electrodes are common for the three sections, and one and the same voltage is applied to each section. The variation in size and shape of the ferroelectric substrate, or more generally of the different sections, gives the different electric fields that are generated upon voltage application. It should be clear that also in this embodiment separate electrodes could be provided for each section, i.e. electrodes which are not electrically interconnected, such that separate leads or conducting wires are required for voltage application. Still further the same voltage may be applied to each section. Alternatively different voltages are applied to the different sections as discussed above to take advantage both of differences in design and in applied voltage for controlling purposes.

Figure 8A:
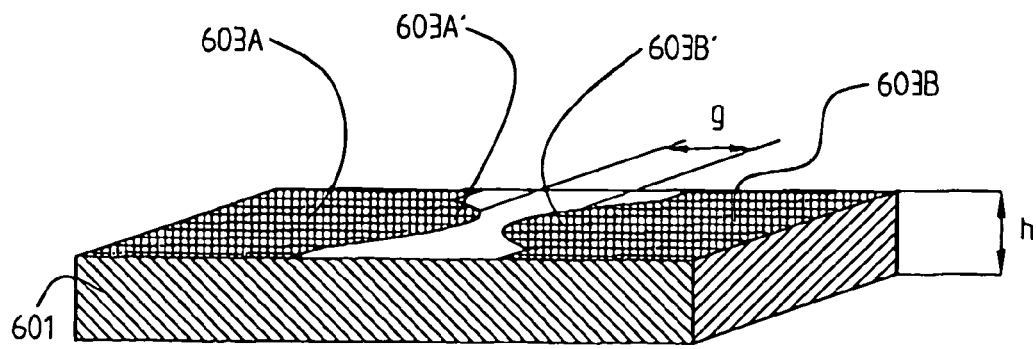
FIG. 8A illustrates an embodiment of a microwave device comprising two planar electrodes with a gap between them.

In FIG. 8A a microwave device 60 comprising a thin film ferroelectric substrate 601 is disclosed. Two planar electrodes 603A, 603B are disposed on the ferroelectric substrate 601. The planar electrodes are provided with protruding oppositely directed portions 603A', 603B' between which a gap is formed. The protruding portions are so formed that the width of the gap and hence the generated electric field will vary, such that a desired slope of the C(V) dependency can be obtained.

Figure 8B:
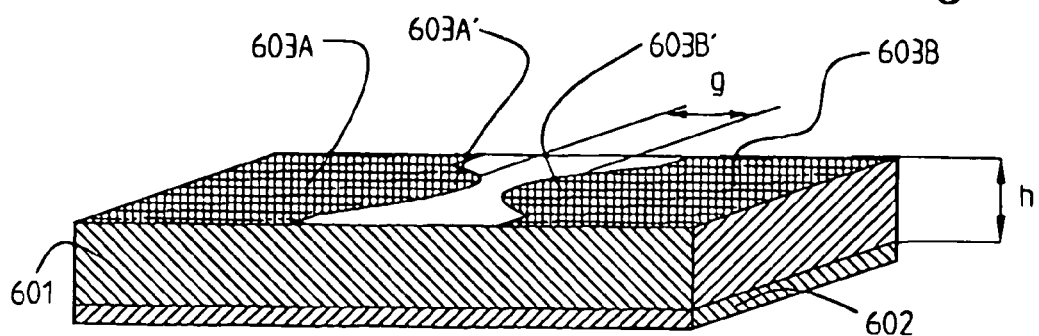
FIG. 8B illustrates an embodiment similar to that of FIG. 8A also including a ground plane electrode.

FIG. 8B shows a structure 70 similar to that of FIG. 8A but including the provisioning of a ground electrode 602.

Figure 8C:
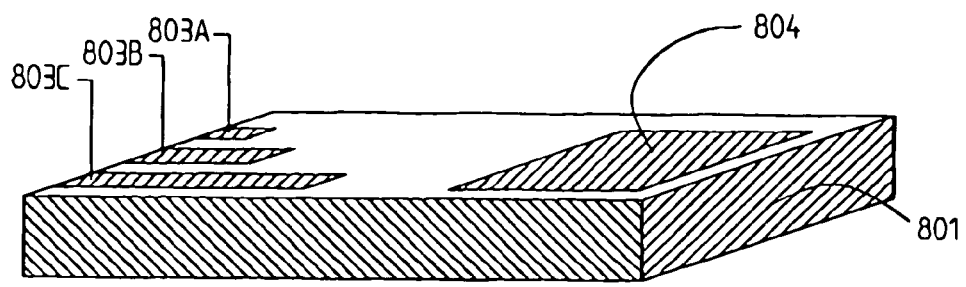
FIG. 8C shows a planar electrode structure with a split-up electrode having sections of different sizes, at different distances from another common electrode, FIG. 9A schematically and for illustrative purposes shows a simple embodiment with three separate sections of the same size and shape to which different voltages are applied.

FIG. 8C illustrates very schematically still another alternative embodiment of a planar structure 80 with a thin film ferroelectric substrate 801 on which electrodes 803A, 803B, 803C and 804 are provided. The sizes (and shapes) of the electrodes 803A, 803B, 803C differ. Electrode 803A is the smallest, followed by electrode 803B which is larger than 803A but smaller than the consecutive electrode 803C, such that also in this case, like in the embodiments of FIGS. 8A, 8B, different electrical fields are developed between the respective electrodes 803A, 803B, 803C and electrode 804 since the dielectric constant of the ferroelectric material will differ from one part of the planar electrode structure to another, and since the capacitance of each respective part of the device depends on the dielectric constant of that part, also the capacitances will differ. By carefully selecting the sizes/shapes of the electrodes, and thus the distances between electrodes, the voltage/capacitance characteristics can be controlled, or particularly linearised corresponding to the derivative dC/dV being a constant.

Figure 9A:
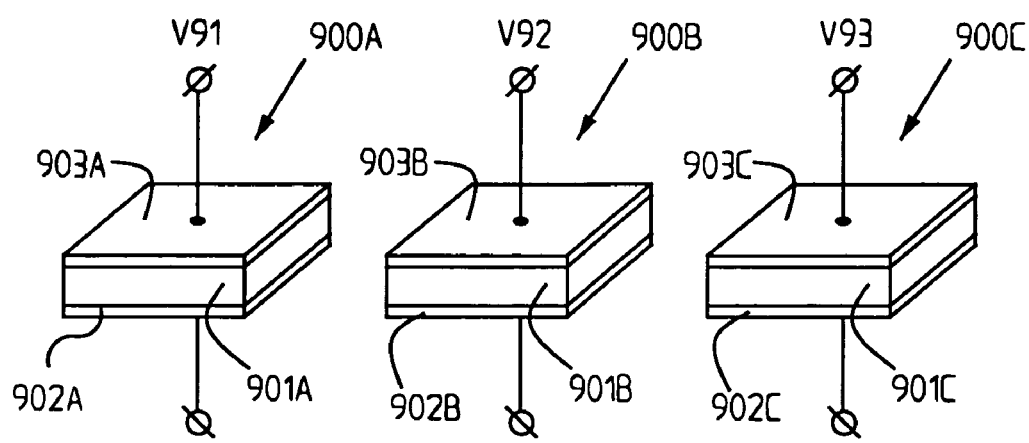
FIG. 9B shows, for illustrative purposes, a device comprising three separate sections of different size and thickness, to which sections the same voltage is applied.
Figure 9B:
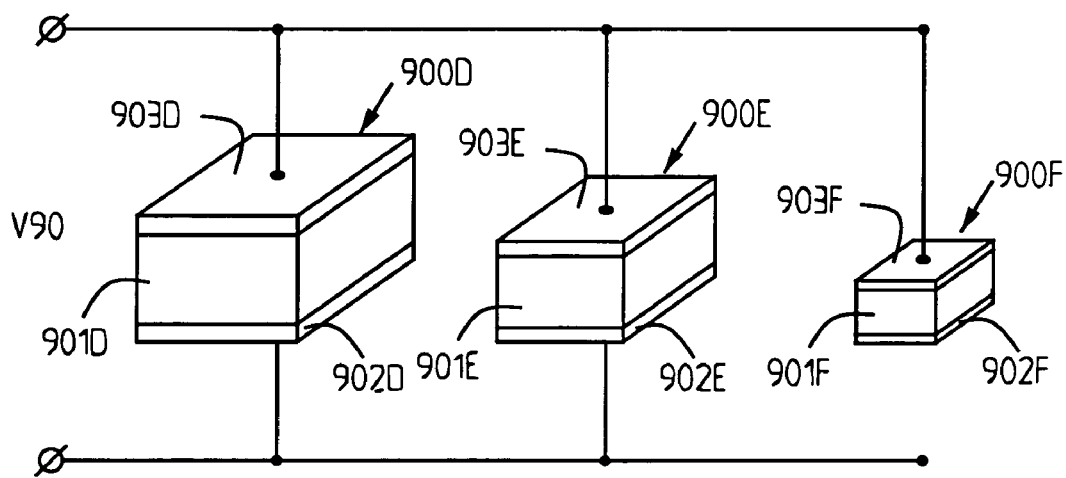

FIG. 9A is an explanatory figure which shows another simplified embodiment in which three separate parallel plate resonators or capacitors are provided, or rather a resonator or a parallel plate capacitor split up into three different sections with respective ferroelectric substrates 901A, 901B, 901C with electrodes 903A, 903B, 903C and 902A, 902B, 902C disposed on either sides thereof respectively. It is supposed that the size and shape of each parallel plate resonator section is the same as the shape of the others and they also have the same thickness. In order to be able to control the capacitance of each part or substructure, different voltages thus have to be applied to the different substructures. It is here supposed that a voltage V91 is applied to the structure 900A, a voltage V92 is applied to structure 900B and finally V93 is applied to structure 900C, whereby V91<V92<V93. Since the dielectric constant of the respective substructure depends on the generated electrical field of the respective structure (E91<E92<E93), the dielectric constant of substructure 900A will be larger than that of substructure 900B which in turn will be larger than that of substructure 900C. Correspondingly the capacitance $C_{11}$ of substructure 900A will be higher than that, $C_{12}$, of substructure 900B which in turn is higher than $C_{13}$ of substructure 900C. It should be clear that, in order to obtain the same effect, it is possible to give the different substructures slightly different thicknesses but still apply different voltages to them. The voltage differences can then be smaller. It is also possible to merely work with the thicknesses and/or shapes, in which case the same voltage can be applied to each substructure. By particular selections of thicknesses/shapes and voltages, other relationships than those referred to above can also be obtained. Such an embodiment is illustrated in FIG. 9B. The parallel plate resonator or capacitor structure 90B is divided into three substructures, wherein substructure 900D is larger and thicker than substructure 900E, which in turn is larger and thicker than substructure 900F. Also in this embodiment each substructure comprises a ferroelectric substrate 901D, 901E, 901F respectively, on either sides of which electrodes 9020, 903D; 902E, 903E; 902F, 903F respectively are disposed. It is supposed that one and the same voltage V90 is applied to each one of the substructures. Depending on how the plate areas and the thicknesses of the structures are selected, the electric field generated in substructure 900D, 900E and 900F respectively can be controlled, which in turn affects the dielectric constant. By selecting the respective areas and thicknesses of the substructures, the slope of the C(V) dependence can be controlled or tailored as desired by changing or affecting the partial contribution of the respective capacitance of the respective different substructures.

It should be noted that the invention of course not is limited to three substructures, but this is merely shown as an example. In general the slope of the C(V) dependence (dC/dV) can be controlled more carefully the more sections or parts there are, and each structure only differing to a minor extent from the adjacent structures as also described more in detail above.

It should be clear that also other ferroelectric or tunable dielectric materials than $SrTiO_3$ can be used. It should be clear that also in other aspects the invention is not limited to the specifically illustrated embodiments, but that it can be varied in a number of ways within the scope of the appended claims.

What is claimed is:

1. An electrically controllable/tunable microwave device having a capacitance which depends on applied voltage C(V), the device comprising:

a ferroelectric substrate with a variable dielectric permittivity and conducting electrodes arranged on said substrate;

at least two sections or parts of the substrate/electrodes for each of which different electrical field strengths are generated upon voltage application, wherein said generated electrical field strengths are controlled by design of the device and/or the voltage application such that a slope (dC(dV) of voltage dependence of the capacitance (C(V)) of the microwave device can be controlled;

wherein each section has a thickness and/or an electrode plate area differing from the thickness(es) and/or the plate area(s) of the other section(s), and wherein the dependance of the capacitance on the voltage is controlled by appropriate selection of the thicknesses and the electrode plate areas of the sections; and wherein a same voltage is applied to the different sections and wherein, for the applied voltage, the generated electric field of a section depends on the thickness and the plate area of the section.

2. A microwave device according to claim 1, further comprising a parallel plate resonator.

3. A microwave device according to claim 1, further comprising a parallel plate capacitor, or a varactor.

4. A microwave device according to claim 1, wherein the substrate comprises a bulk ferroelectric substrate, e.g. of $SrTiO_3$.

5. A microwave device according to claim 1, wherein the device is so shaped and/or (a) voltage(s) is/are so applied that the slope of the dependence of the capacitance on voltage will be linear dC/dV being constant.

6. A microwave device according to claim 1, further comprising one common electrode plate and one common ferroelectric substrate further comprising, for each section separate, second electrodes wherein for each section the thickness of the corresponding ferroelectric substrate portion is different, and wherein the second electrodes are provided at different distances from the common first electrode plate.

7. A microwave device according to claim 1, wherein the device is disk shaped, circular, ellipsoidal or rectangular and wherein a thinnest section has a smallest plate area, said thinnest and smallest section being disposed at a center of the microwave device.

8. A microwave device according to claim 1, wherein the thickness of the ferroelectric substrate is given a trapezoidal shape for providing the different sections.

9. A microwave device according to claim 1, further comprising a large number of different sections, and wherein accuracy of controllability of the slope (dC/dV) of the line representing the dependence of the capacitance on the voltage increases with the number of sections.

10. A microwave device according to claim 9, wherein differences in thickness and plate area from one section to another, between adjacent sections, are infinitesimal, such that the cross-section of the microwave device through the ferroelectric substrate and the common and/or the sectional electrodes exhibits a substantially continuously changing thickness with the thinnest section at the center.

11. A microwave device according to claim 1, wherein generation of different electric fields in different parts/sections or of a continuously varying electric field exclusively is given by the design of the ferroelectric substrate and/or the conducting electrodes.

12. A microwave device according to claim 11, wherein the sections have different thicknesses and plate areas and wherein a same voltage is applied to the different electrode sections.

13. A method of controlling a voltage/capacitance (V/C) characteristic of an electrically controllable/tunable microwave device comprising a ferroelectric substrate, with a variable dielectric permittivity and conducting electrodes disposed on said substrate, the method comprising the steps of:

disposing the ferroelectric substrate and the electrodes such that the device comprises at least two sections or parts;

providing for voltage application to the sections or parts such that a different electric field strength is generated for each of the sections or parts of the device, or that a substantially continuously varying electric field is generated, for controlling the slope (dC/dV) of the voltage dependence of the capacitance;

designing the substrate and the electrodes such that differently sized and/or shaped sections are formed; and, applying a same voltage to the different sections such that different electric field strengths are generated for each of said sections.

14. The method of claim 13, further comprising:
designing the substrate and/or the electrodes, such that upon voltage application the capacitance varies linearly with the applied voltage, i.e. dC/dV is constant.

15. The method of claim 13, further comprising:
designing the substrate and the electrodes such that a parallell plate device is formed and such that a first section has a first (plate) area and a first thickness, and for subsequent sections the thickness and the area increases stepwise or continuously.

16. The method of claim 15, wherein on one side of the substrate a common electrode plate is disposed and wherein the device comprises a parallel plate resonator or capacitor.

17. The method of claim 16, characterized in that it comprises the steps of:
providing a number of electrically separate sections of the same size and shape,
applying different voltages to the similarly shaped sections such that for each section a different electrical field is generated.

18. A method of claim 16, further comprising:
designing the ferroelectric substrate and/or electrodes and/or providing for voltage application to the electrodes such that different electric fields are generated in different parts/sections of the device, or such that a continuously varying electric field is generated, wherein the electric field strength(s) are controlled for determining the slope (dC/dV) of the line representing the dependence of the capacitance on the voltage.

* * * * *